(12) United States Patent
Regis

(10) Patent No.: US 6,405,272 B1
(45) Date of Patent: Jun. 11, 2002

(54) SYSTEM AND METHOD FOR ARBITRATION OF A PLURALITY OF PROCESSING MODULES

(75) Inventor: Robert T. Regis, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/079,600

(22) Filed: May 15, 1998

Related U.S. Application Data

(63) Continuation of application No. 08/671,221, filed on Jun. 27, 1996, now Pat. No. 5,754,803.

(51) Int. Cl.⁷ .......................................... G06F 13/368
(52) U.S. Cl. ................................. 710/121; 710/107
(58) Field of Search ................ 710/119–125, 107–112; 370/438–439

(56) References Cited

U.S. PATENT DOCUMENTS

| | | | |
|---|---|---|---|
| 4,156,277 A | 5/1979 | Seitz et al. ................. 364/200 |
| 4,292,623 A | 9/1981 | Eswaran et al. | |
| 4,458,314 A | 7/1984 | Grimes ........................ 364/200 |
| 4,467,418 A | * 8/1984 | Quinquis .................... 710/119 |
| 4,480,307 A | 10/1984 | Budde et al. ................. 364/200 |
| 4,570,220 A | 2/1986 | Tetrick et al. ............... 364/200 |
| 4,608,700 A | 8/1986 | Kirtley, Jr. et al. ........... 375/36 |
| 4,626,843 A | * 12/1986 | Szeto et al. ............. 340/825.5 |
| 4,646,232 A | 2/1987 | Chang et al. ................. 364/200 |
| 4,667,192 A | * 5/1987 | Schmid et al. ........... 340/825.5 |
| 4,675,865 A | 6/1987 | DeVries et al. ................ 370/85 |
| 4,719,458 A | * 1/1988 | Miesterfeld et al. ..... 340/825.5 |
| 4,744,079 A | 5/1988 | Csapo et al. ................... 370/94 |
| 4,768,145 A | 8/1988 | Wheelwright et al. ...... 364/200 |
| 4,818,985 A | 4/1989 | Ikeda ....................... 340/825.5 |
| 4,914,574 A | 4/1990 | Terada et al. ................ 364/200 |
| 4,974,148 A | * 11/1990 | Matteson ..................... 713/600 |
| 5,101,482 A | * 3/1992 | Kipnis ......................... 710/118 |
| 5,159,551 A | 10/1992 | Brunnett et al. ........ 364/413.13 |
| 5,253,347 A | 10/1993 | Bagnoli et al. .............. 395/325 |
| 5,263,163 A | * 11/1993 | Holt et al. .................... 710/242 |
| 5,276,684 A | 1/1994 | Pearson | |
| 5,287,463 A | 2/1994 | Frame et al. ................ 395/325 |
| 5,355,453 A | 10/1994 | Row et al. ................... 395/200 |
| 5,396,599 A | 3/1995 | Cobbs et al. ................ 395/325 |
| 5,398,243 A | * 3/1995 | Aguilhoh et al. ............ 370/438 |
| 5,509,126 A | 4/1996 | Oprescu et al. .............. 395/307 |
| 5,557,754 A | * 9/1996 | Sone et al. ................... 710/107 |
| 5,561,669 A | 10/1996 | Lenny et al. ................ 370/352 |
| 5,572,687 A | * 11/1996 | Alnuweiri .................... 710/123 |
| 5,689,657 A | * 11/1997 | Desor et al. ................. 710/119 |
| 5,740,174 A | * 4/1998 | Somer ......................... 370/402 |
| 5,754,800 A | * 5/1998 | Lentz et al. ................. 710/116 |
| 5,884,051 A | * 3/1999 | Schaffer et al. ............. 710/107 |
| 5,968,154 A | * 10/1999 | Cho ............................ 710/119 |
| 6,157,963 A | * 12/2000 | Courtright, II et al. ......... 710/5 |

FOREIGN PATENT DOCUMENTS

| | | | |
|---|---|---|---|
| EP | 0022170 A2 | 1/1981 | ............. H04L/5/00 |
| EP | 0525860 A2 | 2/1993 | ........... G06F/13/28 |
| JP | S5837725 | 3/1983 | |
| JP | H773138 | 3/1995 | |

* cited by examiner

*Primary Examiner*—Sumati Lefkowitz
(74) *Attorney, Agent, or Firm*—Volpe and Koenig, P.C.

(57) ABSTRACT

An arbitration system which allows communication between a plurality of competing processing modules over a shared communication bus. The system comprises an arbitration line coupled to a controller located on each processing module. When a processing module desires access to the communication bus, each controller, executing the same arbitration protocol, shifts its respective module address onto the arbitration line and monitors the arbitration line to detect for collisions.

16 Claims, 17 Drawing Sheets

FIG.2
PRIOR ART

| BUS | RAW bandwidth (Mbyte/s) | Data width | Address width | Block xfer? | MUXed data/adr? | Multimaster? | Sync/Async | IRQ Lines [a] | Drivers | Connector [b] | Comments |
|---|---|---|---|---|---|---|---|---|---|---|---|
| STD bus | 1.2 | 8 | 16 | — | — | — | S | 1 | TTL | CE | controller-type applications |
| PC/XT | 5.3 | 8 | 20 | — | — | — | S | 5E | TTL | CE | original IBM PC & compatibles |
| PC/AT | 33 | 8,16 | 20,24 | — | — | (c) | S | 10E | TTL | CE | accepts PC/XT cards |
| EISA | 33 | 8,16,32 | 20,24,32 | • | — | • | S | 11P | TTL | CE | enhanced PC/AT; auto-configure |
| MicroChannel | 20 | 8,16,(32) | 24,(32) | • | — | • | A | 11 | TTL | CE | IBM PS/2; auto-configure |
| Q - bus | 2 | 16 | 22 | • | • | • | A | 4 | (d) | CE | LSI-11,μVAX-I,II;daisy-chained IACK |
| Multibus I | 10 | 8,16 | 20,24 | — | — | • | A | 8 | TTL | CE | Intel; SUN-I and others |
| CAMAC | 3 | 24 | 9 | • | — | — | S | L | TTL/OC | CE | data acquistion & control bus |
| VAX BI | 13.3 | 8,16,24,32 | 32 | • | • | • | S | 4 | TTL | ZIF | VAX 780, 8600 series; parity |
| Multibus II | 40 | 8,16,24,32 | 16,32 | • | • | • | S | M | TTL | DIN | parity; 40MB/s for blk xfer, 20M otherwise |
| NuBus | 40 | 32 | 32 | • | • | • | S | M | TTL | DIN | Macintosh II adds 1 dedicated INT per slot; "" |
| VME | 40 | 8,16,32 | 16,24,32 | • | — | • | A | 7 | TTL | DIN | daisy-chained IACK; SUN-3 |
| Futurebus | 120 | | | | | | A | — | (d) | | |
| Fastbus | 160 | 32 | 32 | • | • | • | A | M | ECL | H | communication across many crates |

(a) E-edge-sensitive; L-LAM ("look at me"); M-"int" via bus mastership; P-programmable edge-or level-sensitive interrupts.
(b) CE-card-edge; DIN-2-part "Eurocard" 96-pin connector; H-high density 2-part conn. (c) almost. (d) National Semi special.

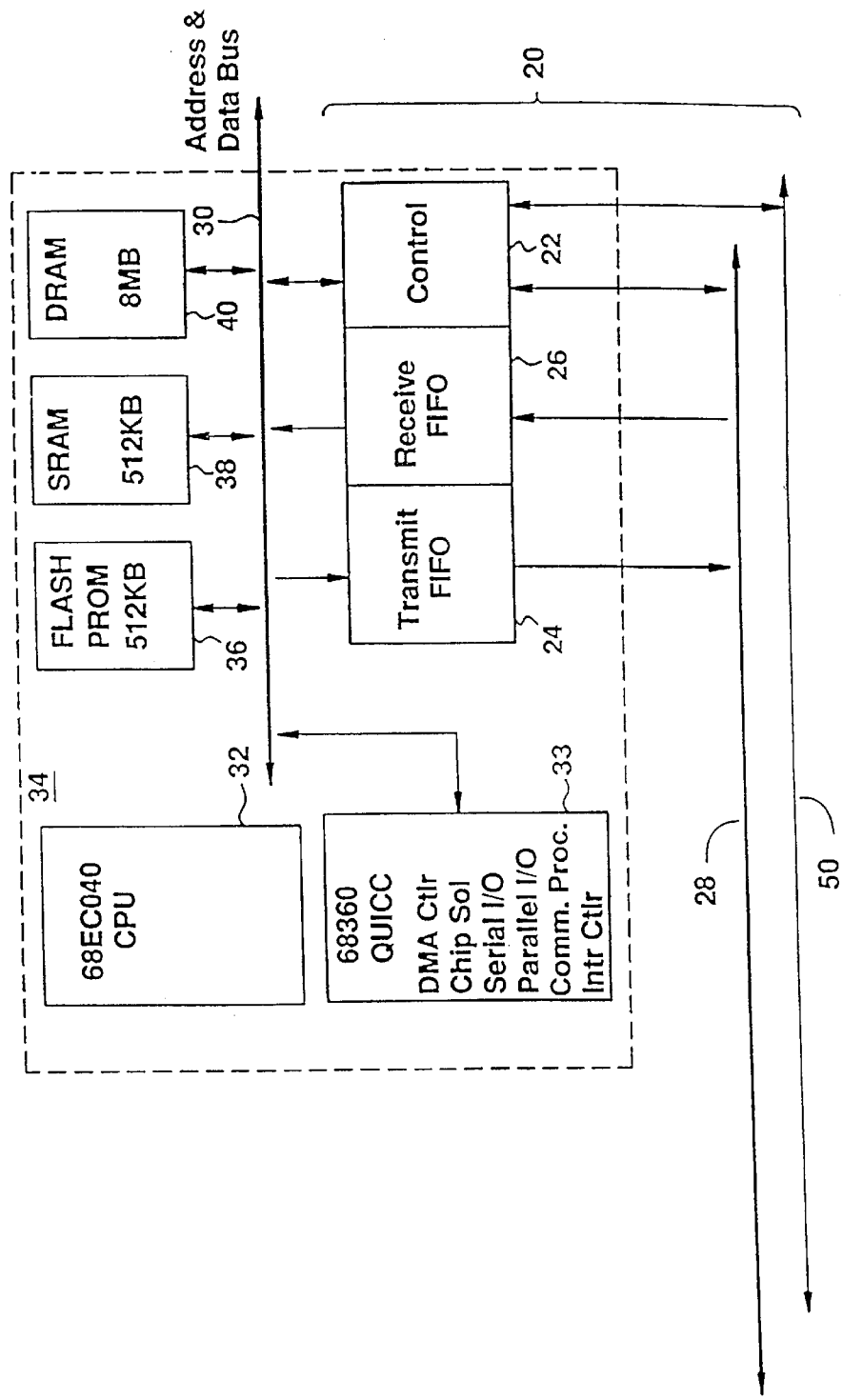

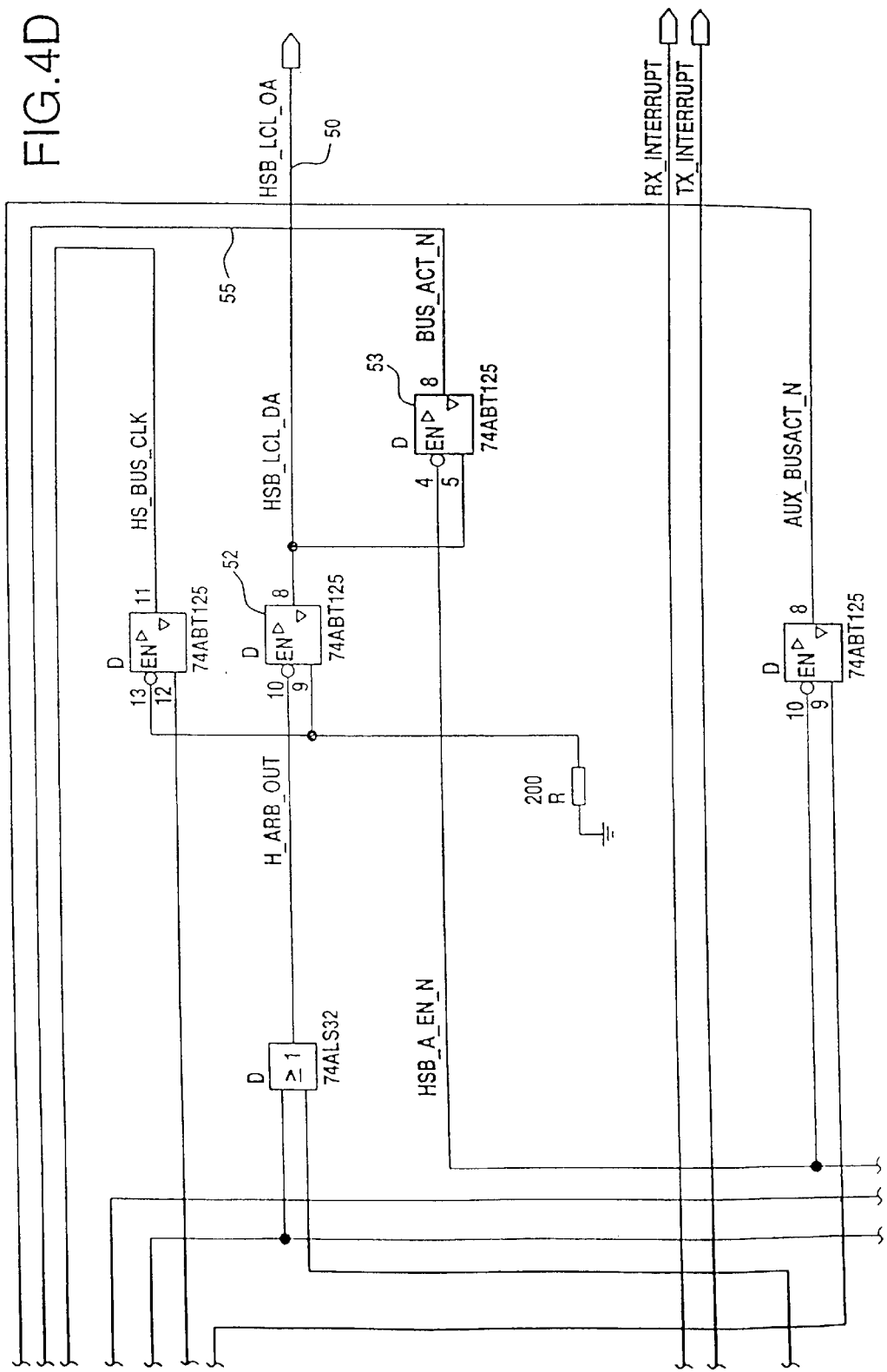

SYSTEM AND METHOD FOR ARBITRATION OF A PLURALITY OF PROCESSING MODULES

CROSS REFERENCE TO RELATED APPLICATION

This is a continuation of application Ser. No. 08/671,221, filed on Jun. 27, 1996, now U.S. Pat. No. 5,754,803 which incorporates by reference application Ser. No. 08/669,775, filed Jun. 27, 1996, now U.S. Pat. No. 5,799,010 as if fully set forth.

BACKGROUND OF THE INVENTION

1. Field of the Invention

This invention relates generally to a system for transferring data between a data processing module and a plurality of data processing modules. More particularly, the invention relates to a high-speed data communication system which transfers information between different digital processing modules on a shared parallel bus.

2. Description of the Related Art

For communication within a digital device, such as between a CPU (central processing unit), memory, peripherals, I/O (input/output) devices, or other data processors, a communication bus is often employed. As shown in FIG. 1, a communication bus is a set of shared electrical conductors for the exchange of digital words. In this manner, communication between devices is simplified, thereby obviating separate interconnections.

A communication bus typically contains a set of data lines, address lines for determining which device should transmit or receive, and control and strobe lines that specify the type of command is executing. The address and strobe lines communicate one-way from a central processing unit. Typically, all data lines are bidirectional.

Data lines are asserted by the CPU during the write instruction, and by the peripheral device during read. Both the CPU and peripheral device use three-state drivers for the data lines.

In a computer system where several data processing devices exchange data on a shared data bus, the two normal states of high and low voltage (representing the binary 1's and 0's) are implemented by an active voltage pullup. However, when several processing modules are exchanging data on a data bus, a third output state, open circuit, must be added so that another device located on the bus can drive the same line.

Three-state or open-collector drivers are used so that devices connected to the bus can disable their bus drivers, since only one device is asserting data onto the bus at a given time. Each bus system has a defined protocol for determining which device asserts data. A bus system is designed so that, at most, one device has its drivers enabled at one time with all other devices disabled (third state). A device knows to assert data onto the bus by recognizing its own address on the control lines. The device looks at the control lines and asserts data when it sees its particular address on the address lines and a read pulse. However, there must be some external logic ensuring that the three-state devices sharing the same lines do not talk at the same time or bus contention will result.

Bus control logic or a "bus arbiter" executes code for the protocol used to arbitrate control of the bus. The bus master may be part of a CPU or function independently. More importantly, control of the bus may be granted to another device. More complex bus systems permit other devices located on the bus to master the bus.

Data processing systems have processors which execute programmed instructions stored in a plurality of memory locations. As shown in FIG. 1, The processed data is transferred in and out of the system by using I/O devices onto a bus, interconnecting with other digital devices. A bus protocol, or handshaking rules delineate a predetermined series of steps to permit data exchange between the devices.

To move data on a shared bus, the data, recipient and moment of transmission must be specified. Therefore, data, address and a strobe line must be specified. There are as many data lines as there are bits in a word to enable a whole word to be transferred simultaneously. Data transfer is synchronized by pulses on additional strobe bus lines. The number of address lines determines the number of addressable devices.

Communication buses are either synchronous or asynchronous. In a synchronous bus, data is asserted onto or retrieved from the bus synchronously with strobing signals generated by the CPU or elsewhere in the system. However, the device sending the data does not know if the data was received. In an asynchronous bus, although handshaking between communicating devices assures the sending device that the data was received, the hardware and signaling complexity is increased.

In most high-speed, computationally intensive multichannel data processing applications, digital data must be moved very rapidly to or from another processing device. The transfer of data is performed between memory and a peripheral device via the bus without program intervention. This is also known as direct memory access (DMA). In DMA transfers, the device requests access to the bus via special bus request lines and the bus master arbitrates how the data is moved, (either in bytes, blocks or packets), prior to releasing the bus to the CPU.

A number of different types of bus communication systems and protocols are currently in use today to perform data transfer. As shown in the table of FIG. 2, various methods have been devised to manipulate data between processing devices. Data communication buses having powerful SDLC/HDLC (synchronous/high-level data link control) protocols exist, along with standardized parallel transmission such as small computer system interface (SCSI) and carrier-sense multiple-access/collision-detection (CSMA/CD) (Ethernet) networks. However, in specialized, high-speed applications, a simplified data communication bus is desired.

Accordingly, there exists a need for a simplified data processing system architecture to optimize data and message transfer between various processor modules residing on a data bus.

SUMMARY OF THE INVENTION

A parallel packetized intermodule arbitrated high speed control data bus system is provided which allows high speed communications between microprocessor modules in a more complex digital processing environment. The system features a simplified hardware architecture featuring fast FIFO (first-in/first-out) queuing operating at 12.5 MHz, TTL CMOS (complimentary metal-oxide silicon) compatible level clocking signals, single bus master arbitration, synchronous clocking, DMA, and unique module addressing for multiprocessor systems. The present invention includes a parallel data bus with sharing bus masters residing on each processing module decreeing the communication and data transfer protocols.

The high-speed intermodule communication bus (HSB) is used for communication between various microprocessor modules. The data bus is synchronous and completely bidirectional. Each processing module that communicates on the bus will have the described bus control architecture. The HSB comprises eight shared parallel data lines for the exchange of digital data, and two additional lines for arbitration and clock signals. No explicit bus request or grant signals are required. The HSB can also be configured as a semi-redundant system, duplicating data lines while maintaining a single component level. The bus is driven by three-state gates with resistor pullups serving as terminators to minimize signal reflections.

To move data on the HSB, each processing module must specify the data, the recipient, and the moment when the data is valid. Only one message source, known as the bus master, is allowed to drive the bus at any given time. Since the data flow is bidirectional, the bus arbitration scheme establishes a protocol of rules to prevent collisions on the data lines when a given processing module microprocessor is executing instructions. The arbitration method depends on the detection of collisions present only on the arbitration bus and uses state machines on each data processing module to determine bus status. Additionally, the arbitration method is not daisy chained, allowing greater system flexibility.

The state machines located on each processing module are the controlling interface between the microprocessor used within a given processing module and the HSB. The circuitry required for the interface is comprised of a transmit FIFO, receive FIFO, miscellaneous directional/bidirectional signal buffers and the software code for the state machines executed in an EPLD (erasable programmable logic device).

Accordingly, it is an object of the present invention to provide a system for high-speed digital data exchange between data processing devices.

It is a further object of the invention to provide a simple method of transferring data which has been processed into and out of a digital system from a plurality of processing modules onto a bus which interconnects all data processing hardware.

It is a further object of the invention to provide an improved, simple method of data transfer.

Other objects and advantages of the system and method will become apparent to those skilled in the art after reading the detailed description of the preferred embodiment.

BRIEF DESCRIPTION OF THE DRAWINGS

FIG. 2 is a table of prior art data bus architectures.

FIG. 3 is a simplified block diagram of the preferred embodiment.

DETAILED DESCRIPTION OF THE PREFERRED EMBODIMENT

Figure 1:
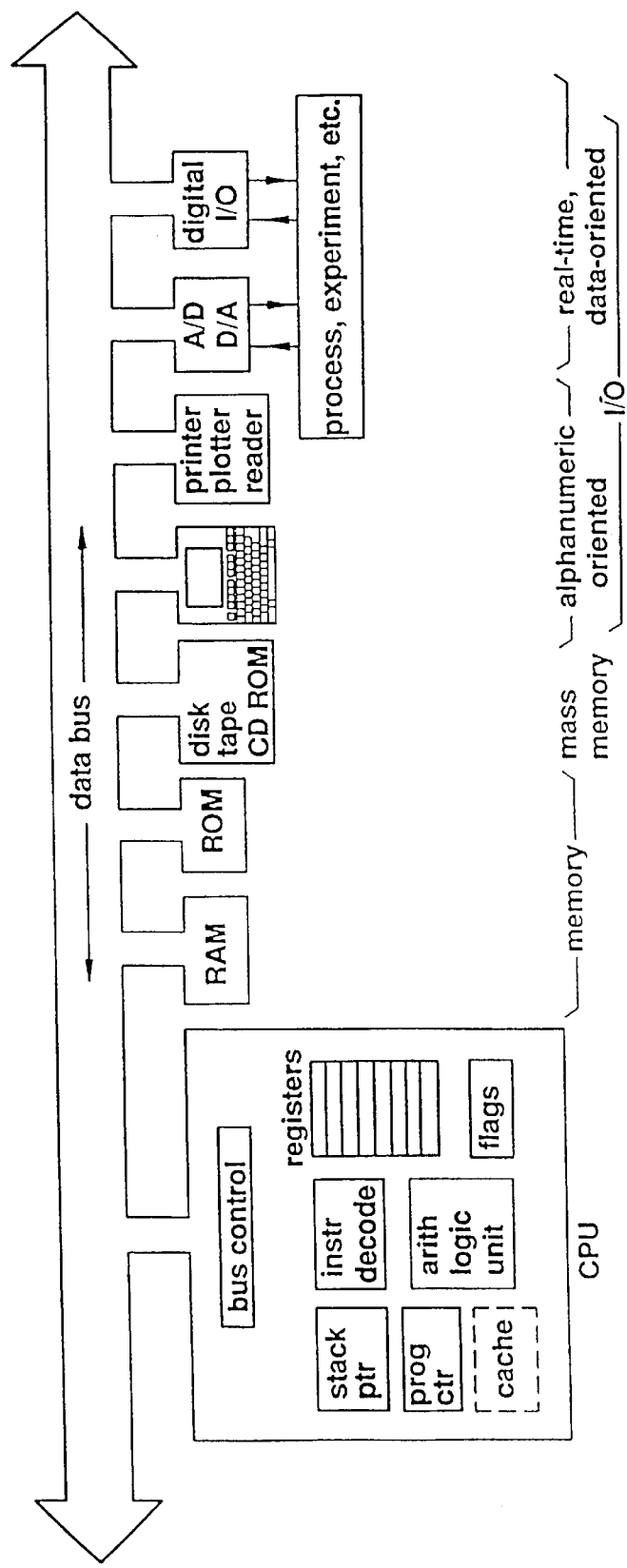
FIG. 1 is a block diagram of a typical, prior art data communication bids.
Figure 4A:
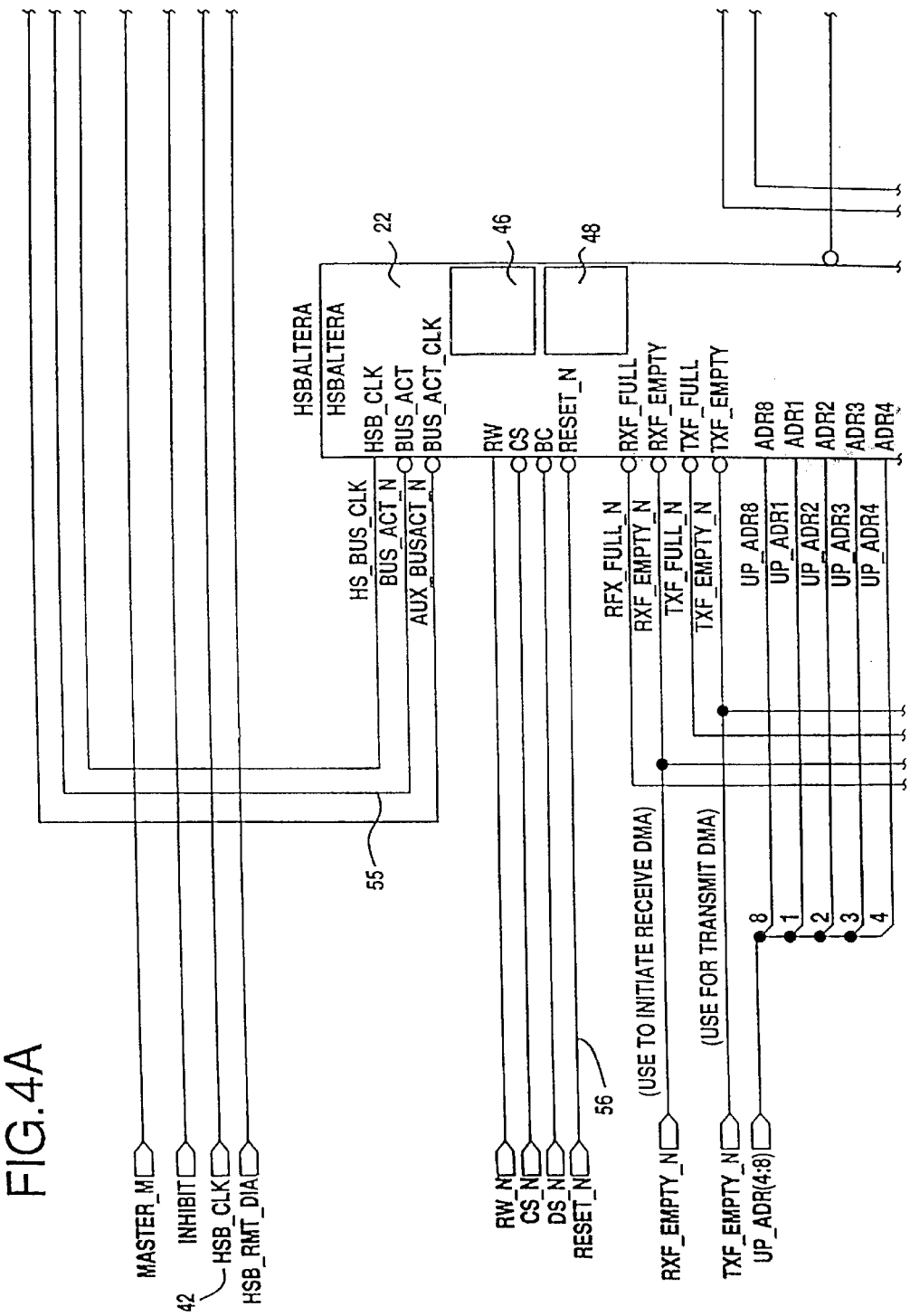
FIGS. 4A through 4D are electrical schematics.
Figure 4B:
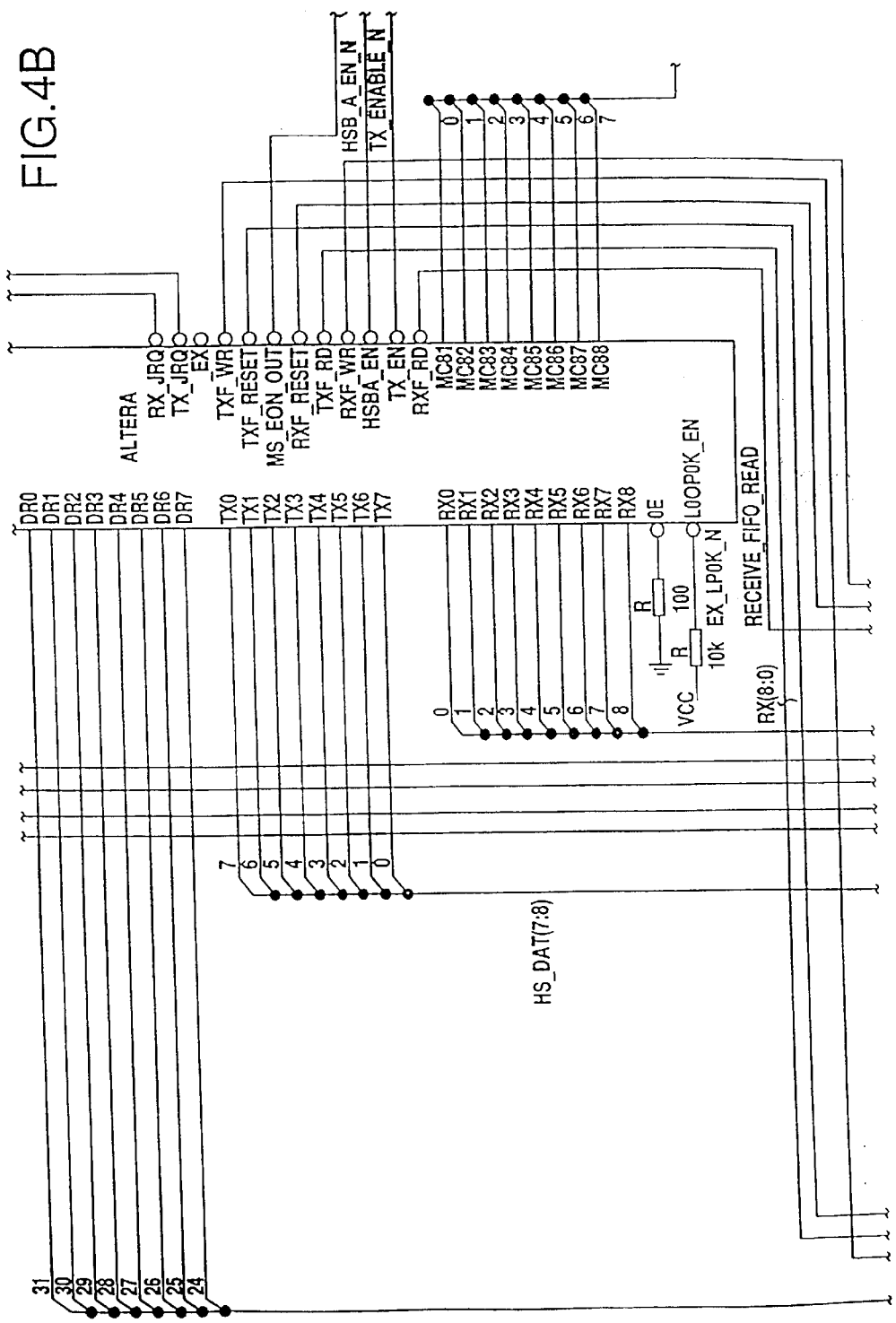
Figure 4C:
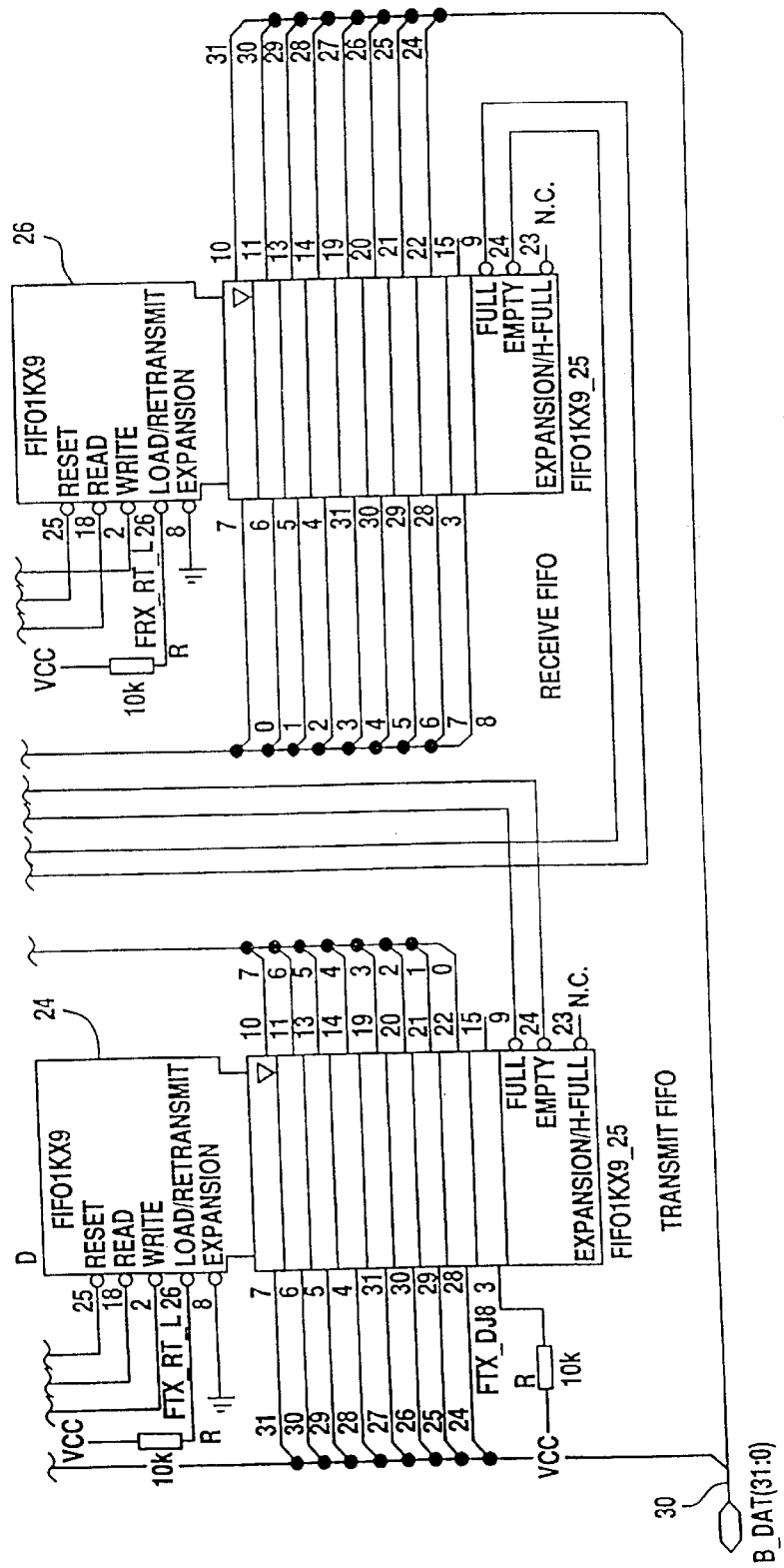
Figure 4E:
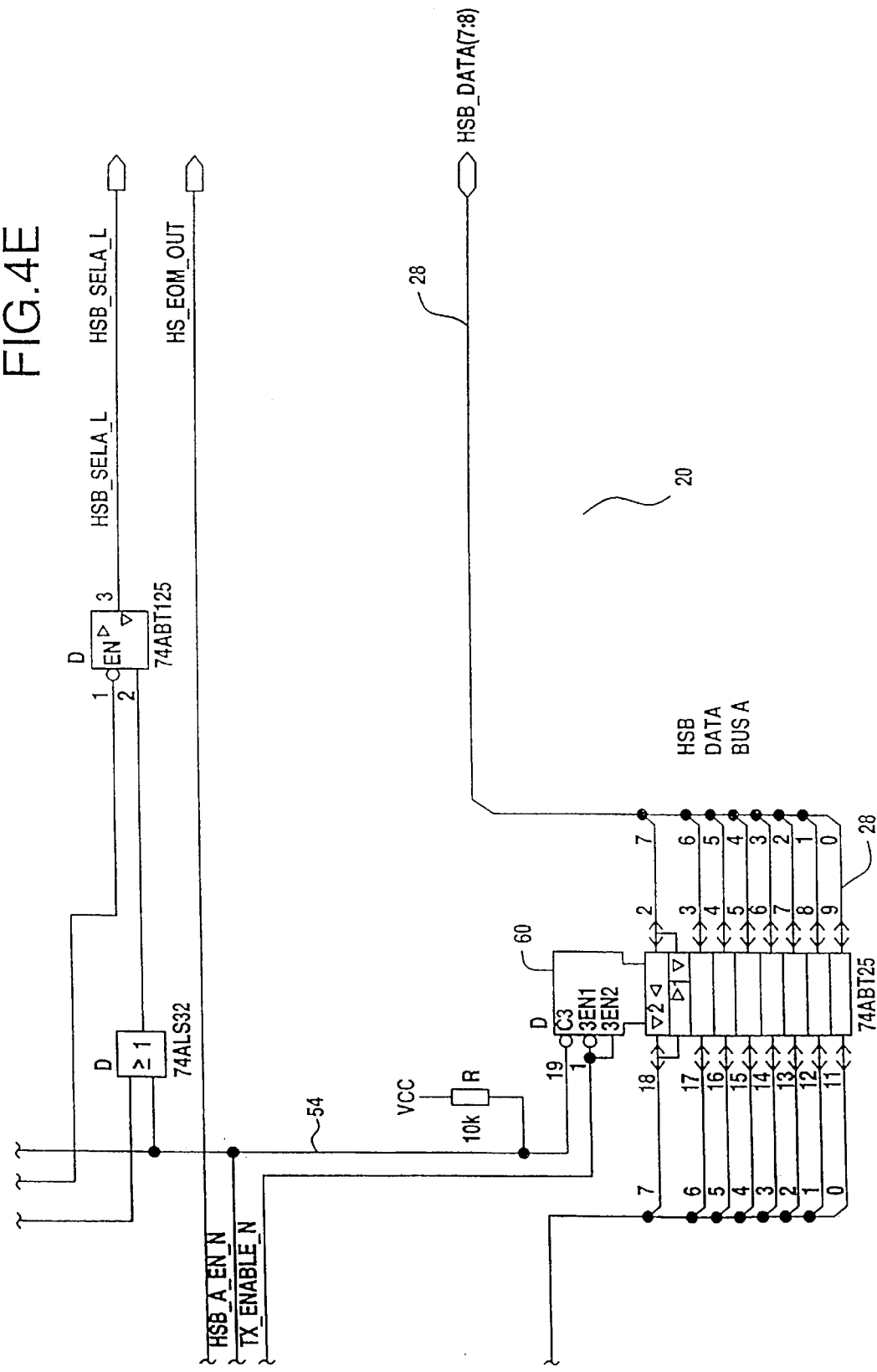

The preferred embodiment will be described with reference to the drawing figures where like numerals represent like elements throughout.

The high-speed intermodule bus (HSB) 20 of the present invention is shown in simplified form in FIG. 3. The preferred embodiment comprises a bus controller 22, a transmit FIFO 24, a receive FIFO 26, an eight bit parallel data bus 28 and a serial arbitration bus 50. The ends of the bus 28 are terminated with a plurality of resistive dividers to minimize signal reflections. An internal 8 bit address and data bus 30 couples the transmit 24 and receive 26 FIFOs and bus controller 22 to a CPU 32 and DMA controller 33 located on a given processor module 34. The internal address and data bus 30 also permits communication between the CPU 32 and bus controller 22 and various memory elements such as PROM 36, SRAM 38, and DRAM 40 required to support the applications of the data processing module 34.

The HSB 20 is a packetized message transfer bus system. Various processor modules 34 can communicate data, control and status messages via the present invention.

The HSB 20 provides high speed service for a plurality of processor modules 34 with minimum delay. The message transfer time between modules is kept short along with the overhead of accessing the data bus 28, and queuing each message. These requirements are achieved by using a moderately high clock rate and a parallel data bus 28 architecture. Transmit 24 and receive 26 FIFOs are used to simplify and speed up the interface between a processor module 34 CPU 32 and the data bus 28.

Referring to FIGS. 4A through 4D, a common clock signal (HSB_CLK) 42 comprising a TTL compatible CMOS level signal with a frequency nominally 12.5 MHz and a duty cycle of approximately 50 synchronizes all HSB 20 components and executions. The clock 42 pulse may originate in any part of the complete digital system and its origination is beyond the scope of this disclosure.

The parallel data bus 28 (HSB_DAT) lines 0–7, provides 8 bidirectional TTL compatible CMOS level signals. Only one message source, the bus controller or master 22, is allowed to drive the bus 28 at any one time. A bus arbitration scheme determines which out of a plurality of processing module may become bus master and when.

The relationship of the data 28 and control signal transitions to the clock 42 edges are important to recovering the data reliably at a receiving module. Data is clocked out from a transmitting module 34 onto the data bus 28 with the negative or trailing edge of the clock signal 42. The data is then clocked on the positive or leading edge of the clock signal 42 at an addressed receiving module. This feature provides a sufficient setup and hold time of approximately 40 ns without violating the minimum setup time for octal register 60.

Before data can be transmitted on the data bus 28, the bus controller 22 must obtain permission from the arbitration bus 50 to prevent a possible data collision. The message source must win an arbitration from a potential multiplicity of processor module 34 access requests. The winner is granted temporary bus mastership for sending a single message. After the transfer of data is complete, bus mastership is relinquished, thereby permitting bus 28 access by other processor modules 34.

No explicit bus request and grant signals are required with the serial arbitration method of the present invention. The preferred method eliminates complex signaling and signal lines, along with the requisite centralized priority encoder and usual granting mechanism. The arbitration method is not daisy chained so that any processor module location on the bus 28 may be empty or occupied without requiring a change to address wiring.

In the present invention, the open-collector arbitration bus 50 permits multiple processing modules 34 to compete for control of the data bus 28. Since no processing module 34 in the digital system knows a priori if another processing module has accessed the arbitration bus 50, modules within the HSB system may drive high and low level logic signals on the HSB simultaneously, causing arbitration collisions. The collisions occur without harm to the driving circuit elements. However, the collisions provide a method of determining bus activity.

The arbitration bus 50 includes pullup resistors connected to a regulated voltage source to provide a logic 1 level. The arbitration bus driver 52 connects the arbitration bus 50 to ground to drive a logic 0 level. This results in a logic 1 only when no other processing module 34 drives a logic 0. The arbitration bus 50 will be low if any processing module 34 arbitration bus 50 driver 52 asserts a logic 0.

As known to those familiar with the art, the connection is called "wired-OR" since it behaves like a large NOR gate with the line going low if any device drives high (DeMorgan's theorem). An active low receiver inverts a logic 0 level, producing an equivalent OR gate. Using positive-true logic conventions yields a "wired-AND," using negative logic yields a "wired-OR." This is used to indicate if at least one device is driving the arbitration bus 50 and does not require additional logic. Therefore, if a processing module 34 asserts a logic 1 on the arbitration bus 50 and monitors a logic 0, via buffer 53 on monitor line 55 (BUS_ACT_N), the processing module 34 bus controller 22 determines that a collision has occurred and that it has lost the arbitration for access.

The arbitration method depends on the detection of collisions and uses state machines 46 and 48 within the bus controller 22 on each processing module 34 to determine arbitration bus 50 status as arbitration proceeds. All transitions on the arbitration bus 50 are synchronized to the bus clock 42. Each processor module 34 has a unique programmed binary address to present to the arbitration bus 50. The device address in the current embodiment is six bits, thereby yielding 63 unique processing module 34 identifications.

Each processing module 34 bus controller 22 located on the HSB 20 monitors, (via a buffer 53), and interrogates, (via a buffer 52), the arbitration bus (HSBI_ARB1_N) 50. Six or more high level signals clocked indicate that the bus is not busy. If a processing module 34 desires to send a message, it begins arbitration by serially shifting out its own unique six bit address onto the arbitration bus 50 starting with the most significant bit. Collisions will occur on the arbitration bus 50 bit by bit as each bit of the six bit address is shifted out and examined. The first detected collision drops the processing module 34 wishing to gain access out of the arbitration. If the transmit state machine 46 of the sending module 34 detects a collision it will cease driving the arbitration bus 50, otherwise it proceeds to shift out the entire six bit address. Control of the data bus 28 is achieved if the entire address shifts out successfully with no errors.

A priority scheme results since logic 0's pull the arbitration bus 50 low. Therefore, a processor module 34 serially shifting a string of logic 0's that constitute its address will not recognize a collision until a logic 1 is shifted. Addresses having leading zeroes effectively have priority when arbitrating for the bus 50. As long as bus 28 traffic is not heavy, this effect will not be significant.

In an alternative embodiment, measures can be taken to add equity between processor modules 34 if required. This can be done by altering module arbitration ID's or the waiting period between messages.

Once a processor module 34 assumes bus mastership it is free to send data on the data bus 28. The bus controller 22 enables its octal bus transceiver (driver) 60 and transmits at the clock 42 rate. The maximum allowed message length is 512 bytes. Typically, messages will be 256 bytes or shorter. After a successful arbitration, the arbitration bus 50 is held low by the transmitting processor module 34 during this period as an indication of a busy arbitration bus 50.

Once the data transfer is complete, the bus controller 22 disables its octal bus transceiver (drivers) 60 via line 54 (HSB_A_EN_N) and releases the arbitration bus 50 to high. Another arbitration anywhere in the system may then take place.

An alternative embodiment allows bus 28 arbitration to take place simultaneous with data transfer improving on data throughput throughout the digital system. In the preferred embodiment, the delay is considered insignificant obviating the added complexity.

The bus controller 22 is required to control the interface between the processing module 34 microprocessor 32 and the HSB 20 and between the HSB and the bus (data bus 28 and arbitration bus 50) signals. In the preferred embodiment the bus controller 22 is an Altera 7000 series EPLD (erasable programmable logic device). The 8 bit internal data bus 30 interfaces the bus controller 22 with the processor module 34 CPU 32. The processor module 34 CPU 32 will read and write directly to the bus controller 22 internal registers via the internal data bus 30. The bus controller 22 monitors the arbitration bus 50 for bus status. This is necessary to gain control for outgoing messages and to listen and recognize its address to receive incoming messages. The bus controller 22 monitors and controls the data FIFO's 24 and 25, DMA controller 33, and bus buffer enable 54.

The components used in the preferred embodiment are shown in Table 1.

TABLE 1

| QTY | MANU-FACTURER | PART NUMBER | DESCRIPTION | ELEMENT |
|---|---|---|---|---|
| 1 | IDT or Samsung | IDT7202LA-50J KM75C02AJ50 | 1K × 9 Receive FIFO | 24 |
| 1 | IDT or Samsung | IDT7204LA-50J KM75C04AJ50 | 4K × 9 Transmit FIFO | 26 |
| 1 | TI or TI | SN74ABT125 SN74BCT125 | Quad tristate driver | 58 |
| 3 | TI or TI | SN74ABT245 SN74BCT245 | TTL Octal Buffers | 60 |
| 1 | Altera | 7128E | erasable programmable logic device | 22 |

Address decoding and DMA gating are required and are performed in the bus controller 22. The bus controller 22 also contains a number of internal registers that can be read or written to. The CPU 32 communicates with and instructs the bus controller 22 over the 8 bit internal data bus 30.

Loading the transmit FIFO 24 is handled by the bus controller 22, DMA and address decoding circuits contained within the bus controller 22. Gaining access to the bus 28 and unloading the FIFO 24 is handled by the transmit state machine.

On power up the bus controller 22 receives a hardware reset 56. The application software running on the processor module 34 CPU 32 has the option of resetting the bus controller 22 via a write strobe if the application requires a module reset. After a reset, the bus controller 22 monitors the arbitration bus 50 on line 55 to determine bus activity and to sync with the data bus 28.

After a period of inactivity the bus controller 22 knows that the bus 28 is between messages and not busy. A processor module 34 can then request control of the bus via arbitration. If no messages are to be sent, the bus controller 22 continues to monitor the arbitration bus 50.

The processor module CPU 32 writes messages into the transmit FIFO 24 at approximately 20 MBps. The DMA controller, a Motorola 68360 33 running at 25 MHz will be able to DMA the transmit FIFO 24 at approximately 12.5 MBps. Since only one message is allowed in the transmit FIFO 24 at any one time, the CPU 32 must buffer additional transmit messages in its own RAM 40. Since the maximum allowable message length is 512 bytes with anticipated messages averaging 256 bytes, a FIFO length of 1 KB is guaranteed not to overflow. Once a message has been successfully sent, the transmit FIFO 24 flags empty and the next message can be loaded.

A typical 256 byte message sent by a processing module 34 CPU 32 at 12.5 MBps will take less than 21 $\mu$sec from RAM 40 to transmit FIFO 24. Bus arbitration should occupy not more than 1 $\mu$sec if the bus is not busy. Total elapsed time from the loading of one transmit message to the next is approximately 43 to 64 $\mu$sec. Since not many messages can queue during this period, circular RAM buffers are not required.

Figure 5:
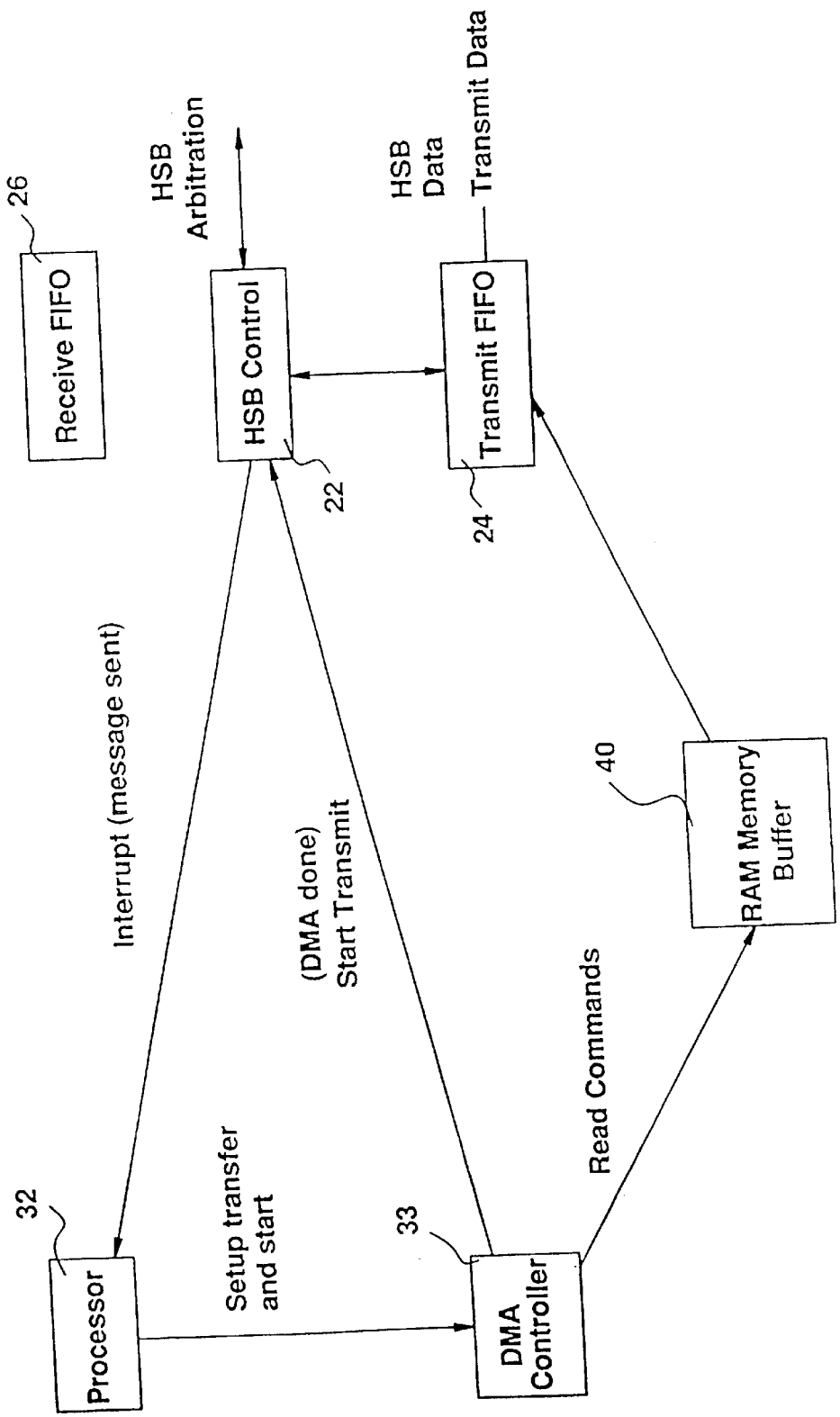
FIG. 5 is a block diagram of the message transmit DMA.
Figure 7:
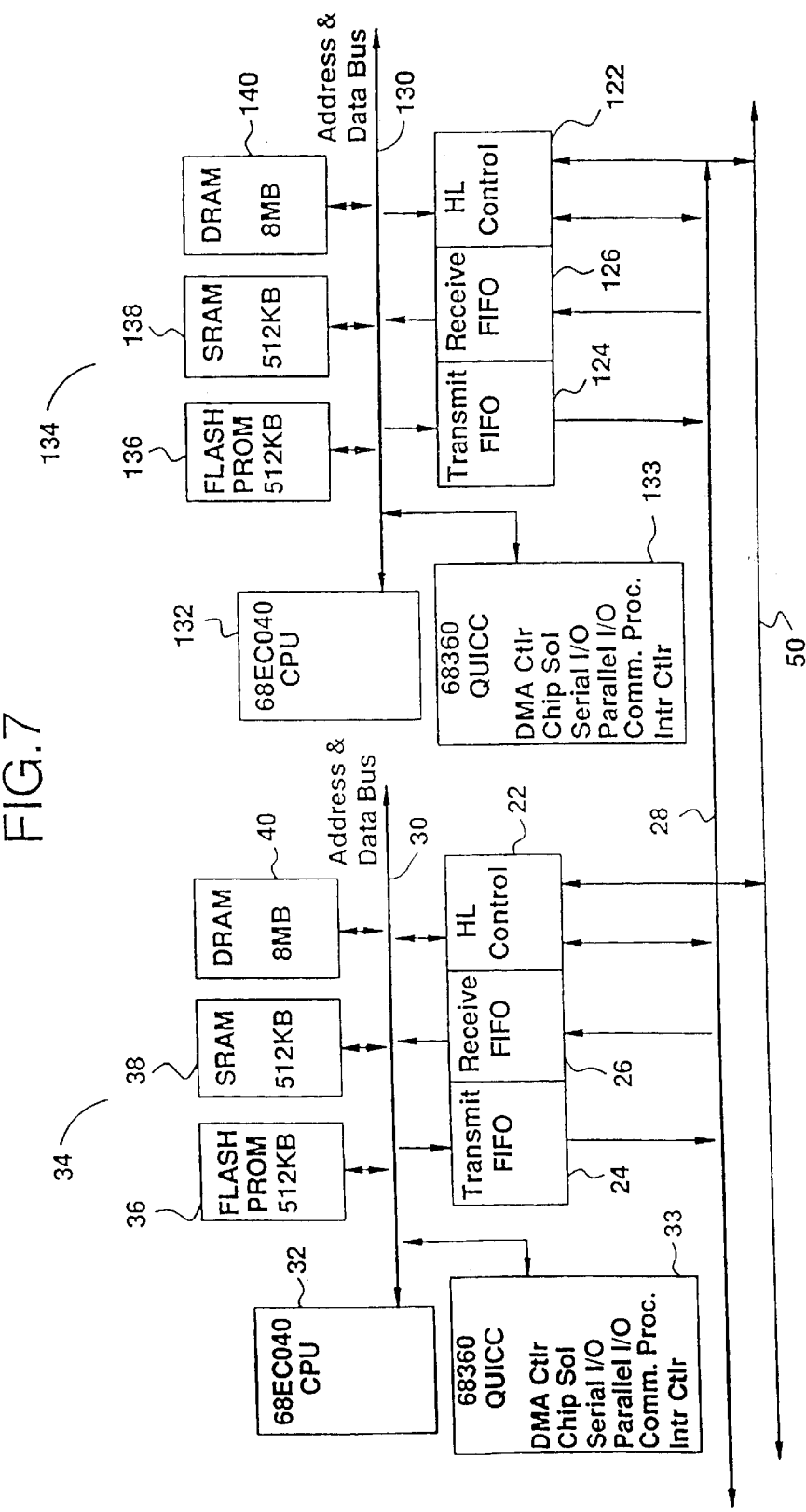
FIG. 7 is a block diagram of the digital processor system.

As shown in FIGS. 5 and 7, during DMA transfers, the DMA controller 33 disables the processor module 34 CPU 32 and assumes control of the internal data bus 30. The DMA transfer is brought about by the processor module 34 or by a request from another processor module 134. The other processor 134 successfully arbitrates control of the data bus 28 and signals the processor module CPU 32. The CPU 32 gives permission and releases control of bus 30. The processor module CPU 32 signals the DMA controller 33 to initiate a data transfer. The DMA controller 33 generates the necessary addresses and tracks the number of bytes moved and in what direction. A byte and address counter are a part of the DMA controller 33. Both are loaded from the processor module CPU 32 to setup the desired DMA transfer. On command from the CPU 32, a DMA request is made and data is moved from RAM memory 40 to the transmit FIFO 24.

Data transferred on the bus 28 is monitored by each processing module 34 located on the bus 28. Each bus controller 22 in the entire processor system contains the destination addresses of all devices on the bus 28. If a match is found, the input to that receiving processing module 34 FIFO 26 is enabled. Since multiple messages may be received by this FIFO 26, it must have more storage than a transmit FIFO 24. The receive FIFO 26 has at a minimum 4 KBx 9 of storage. This amount of storage will allow at least 16 messages to queue within the receive FIFO 26 based on the message length of 256 bytes. A message burst from multiple sources could conceivably cause multiple messages to temporarily congest the receive FIFO 26. The receiving module CPU 32 must have a suitable message throughput from the receive FIFO 26 or else a data overflow will result in lost information. DMA is used to automatically transfer messages from the receive FIFO 26 to RAM 40. The transfer time from the receive FIFO 26 to RAM 40 is typically 21 $\mu$sec.

Figure 6:
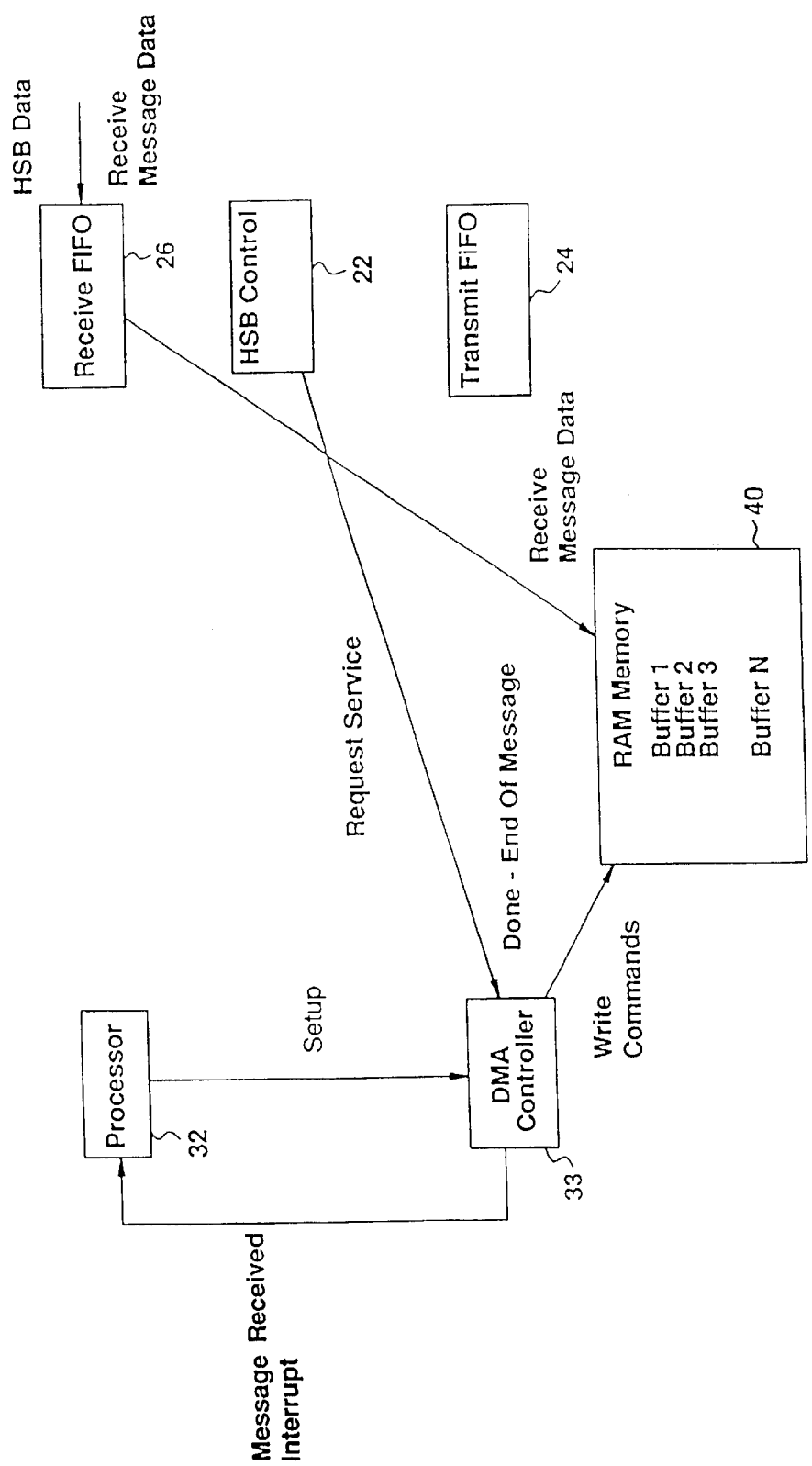
FIG. 6 is a block diagram of the message receive DMA.

When a message is received by the bus controller 22, a request for DMA service is made. Referring to FIG. 6, the DMA controller 33 generates a message received hardware interrupt (DMA DONE) and signals processor module CPU 32 that it has control of the internal bus 30. An interrupt routine updates the message queue pointer and transfers the contents of receive FIFO 26 to RAM memory 40. The DMA controller 33 is then readied for the next message to be received and points to the next available message buffer. This continues until all of the contents of the receive FIFO 26 are transferred. An end of message signal is sent by the receive FIFO 26 to the DMA controller 33 via the bus controller 22. The processor module 34 CPU 32 then regains control of the internal communication bus 30.

The total elapsed time that it takes for a source to destination message transfer is approximately 64 to 85 $\mu$sec. As shown in FIG. 7, the time is computed from when a processor module 34 starts to send a message, load its transmit FIFO 24, arbitrate and acquire the data bus 28, transfer the data to the destination receive FIFO 126, bus the message to the CPU 132, and then finally transfer the message into RAM 140 of the recipient module 134. The actual throughput is almost 200 times that of a 8 KBps time slot on a PCM highway.

Controlling the HSB 20 requires two state machines; one transmitting information 70, the other receiving information 72. Both state machines are implemented in the bus controller 22 as programmable logic in the form of Altera's MAX+PLUS II, Version 6.0 state machine syntax.

Any arbitrary state machine has a set of states and a set of transition rules for moving between those states at each clock edge. The transition rules depend both on the present state and on the particular combination of inputs present at the next clock edge. The Altera EPLD 22 used in the preferred embodiment contains enough register bits to represent all possible states and enough inputs and logic gates to implement the transition rules.

Figure 8:
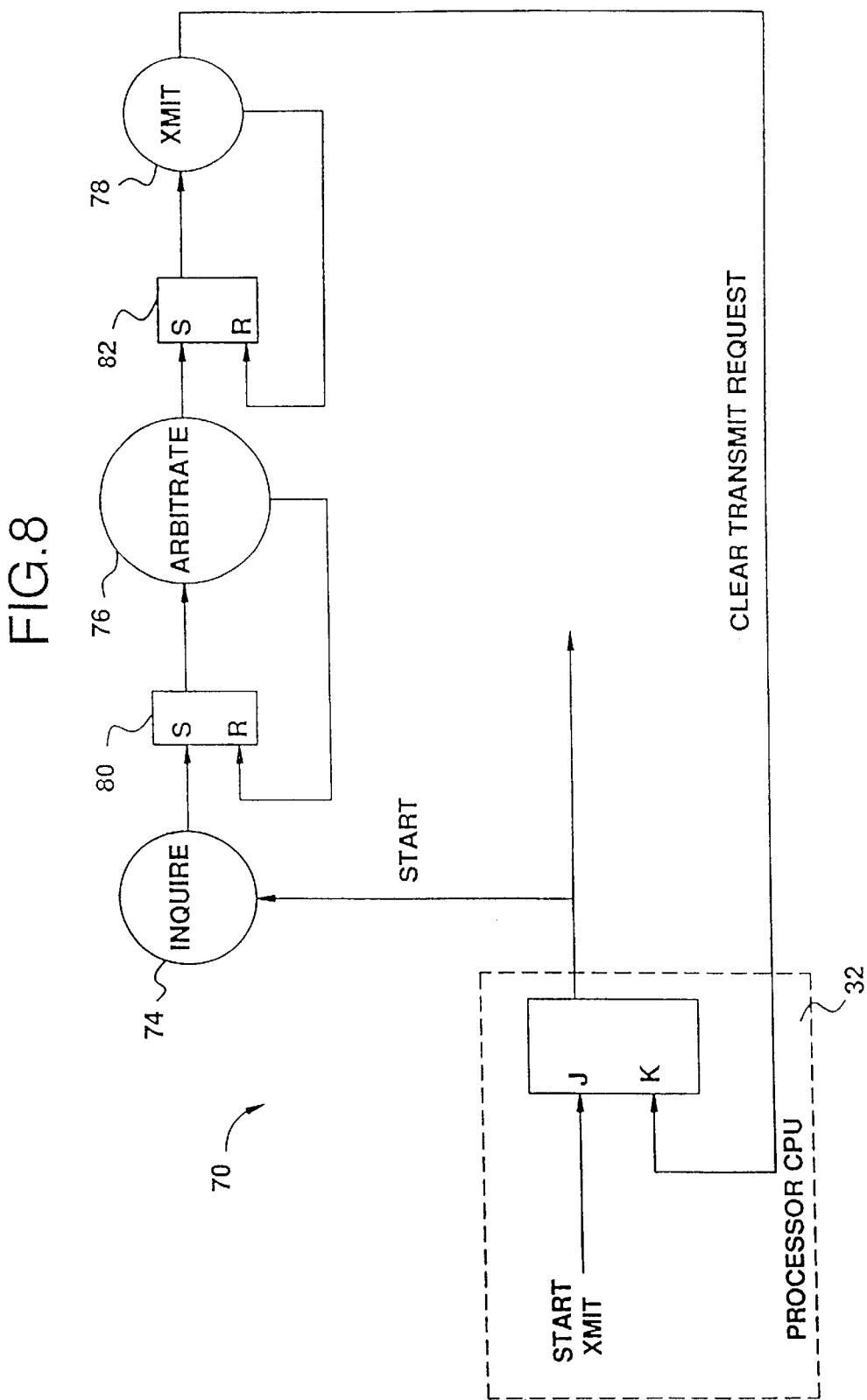
FIG. 8 is a general flow diagram of the transmit instruction.

A general transmit program flow diagram 70 for the transmit state machine is shown in FIG. 8. Within the general flow diagram 70 are three state machine diagrams for the inquire 74, arbitrate 76, and transmit 78 phases of the transmit state machine.

Figure 9:
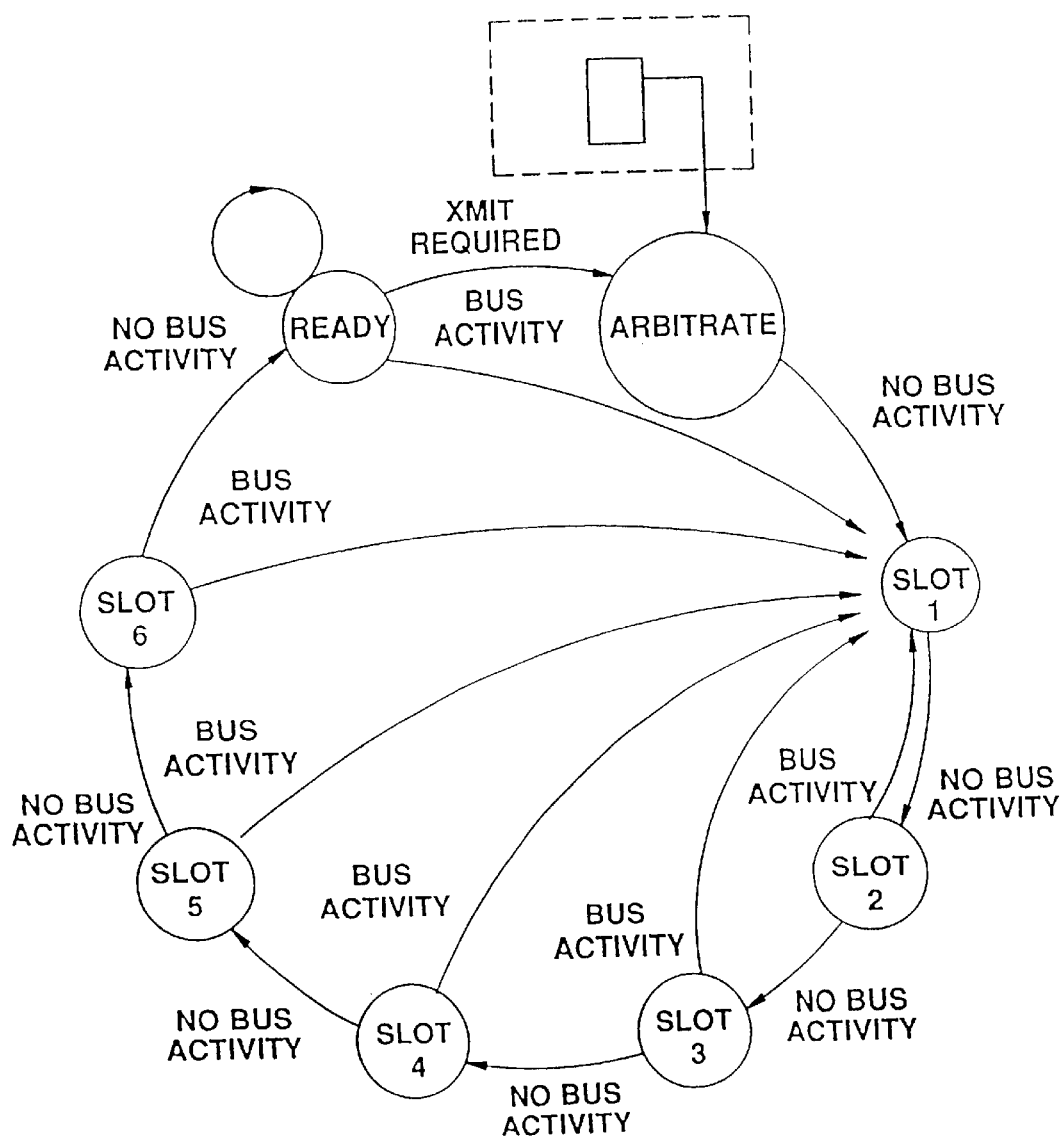
FIG. 9 is a state diagram of the inquiry phase.

The processor module CPU 32 initiates the inquire phase 74. As shown in FIG. 9, eight states are shown along with the transition rules necessary for the bus controller 22 to sense bus activity. After initiation, a transmit request is forwarded to the bus controller 22 to see if there is bus activity. The bus controller 22 monitors the arbitration bus 50 for a minimum of 7 clock cycles. Six internal bus controller addresses are examined for collisions. If no collisions are detected, a request to arbitrate is made on the inactive bus.

Figure 10:
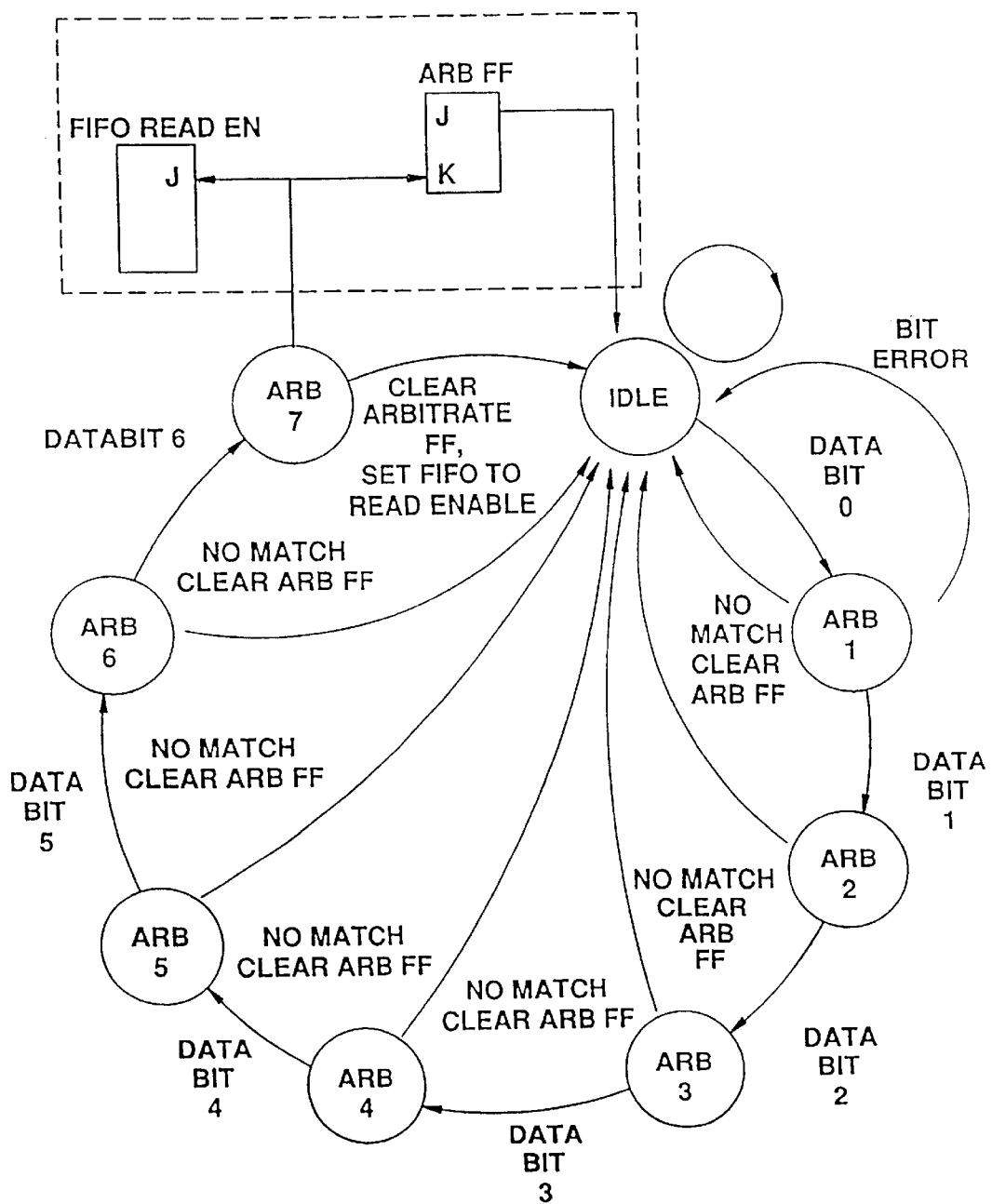
FIG. 10 is a state diagram of the arbitrate phase.

As shown in FIG. 10, the arbitrate request sets a flip-flop 80 and begins sending out a unique identifier followed by six address bits on the arbitration line (HSBI_ARB1_N) 50. A collision is detected if any of the bits transmitted are not the same as monitored. If the six bits are successfully shifted onto the bus 28, then that particular bus controller 22 has bus mastership and seizes the bus. A transmit FIFO 24 read enable is then set. If any one of the bits suffers a collision, the arbitration bus 50 is busy and the processor module 34 stops arbitrating.

Figure 11:
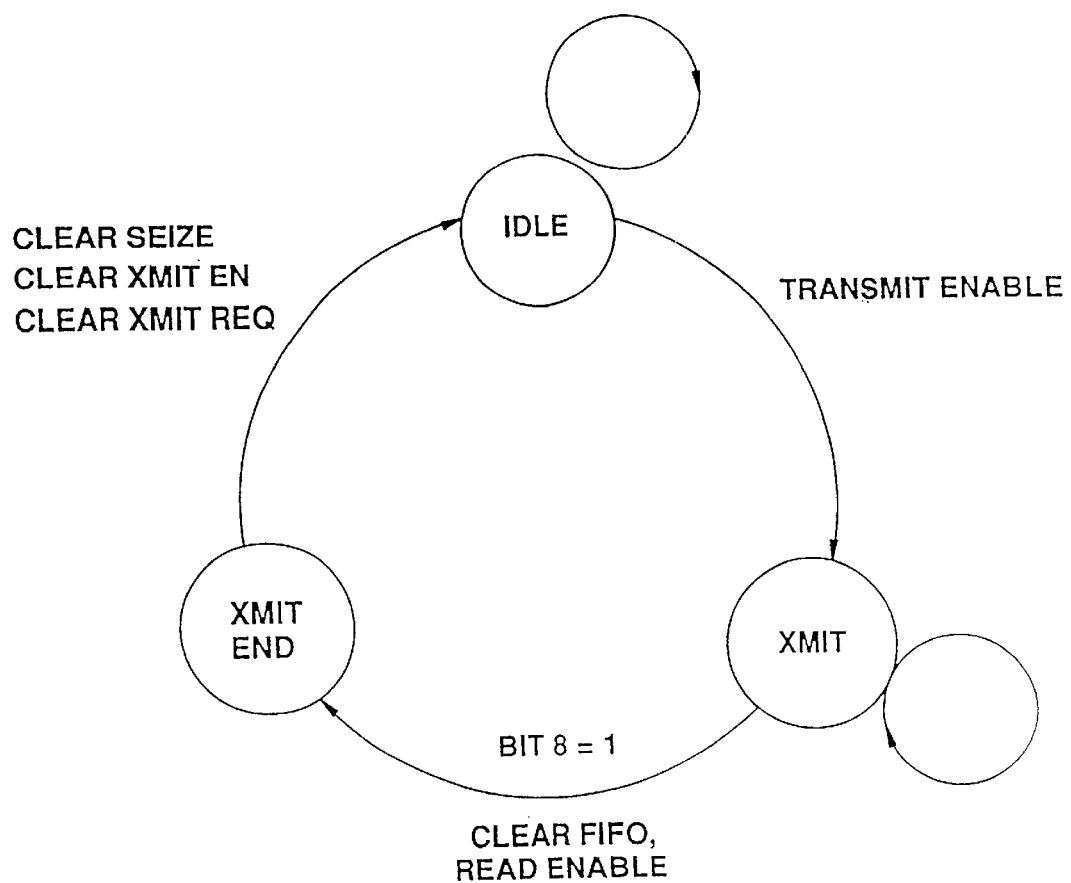
FIG. 11 is a state diagram of the transmit phase.

Referencing FIG. 11, the transmit FIFO 24 read enable sets a flip-flop 82 and initiates a transmit enable. The contents of transmit FIFO 24 are output through the bus controller 22, through octal bus transceiver 60, onto the data bus 28. The data is transmitted until an end of message flag is encountered. Once the transmit FIFO 24 is emptied, a clear transmit request signal is output, returning the bus controller 22 back to monitoring the bus 28.

Figure 12:
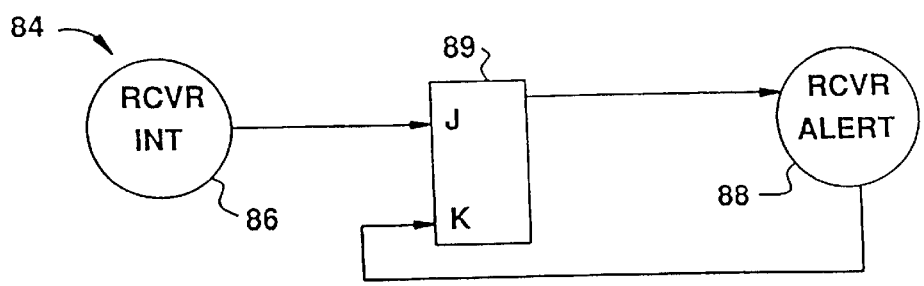
FIG. 12 is a general flow diagram of the receive instruction.

The state machine for controlling the receive FIFO 26 is similarly reduced into two state machines. As shown in FIG. 12, a general flow diagram is shown for controlling the receive FIFO 26.

Referencing FIG. 12, the bus controller 22 monitors the arbitration bus 50 for a period lasting seven clock cycles. Bus activity is determined by the reception of a leading start bit from another processor module 34 bus controller 22. If after seven clock cycles the bus has not been seized, a receive alert signal is input to receive flip-flop 89.

Figure 13:
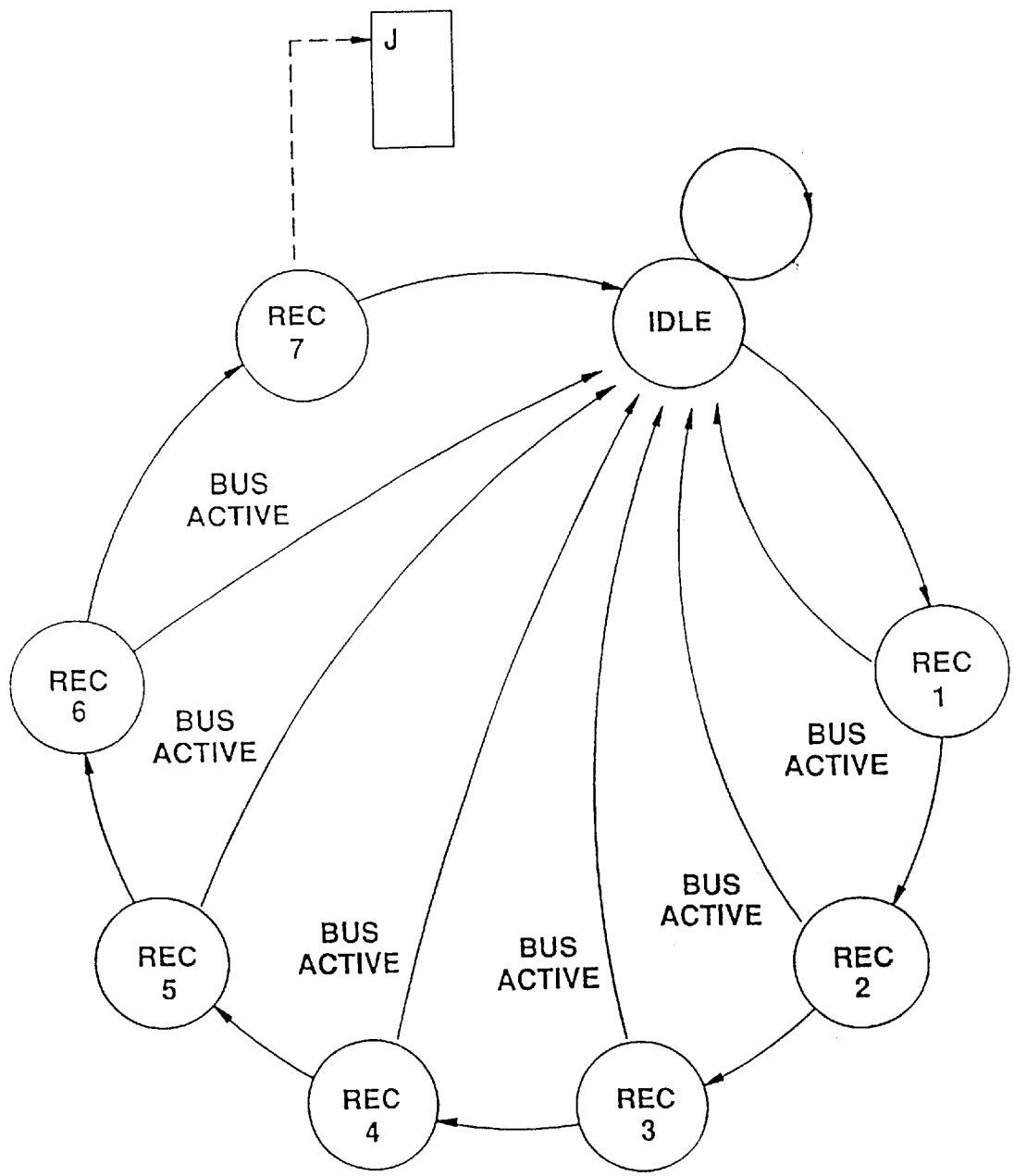
FIG. 13 is a state diagram of the delay phase.
Figure 14:
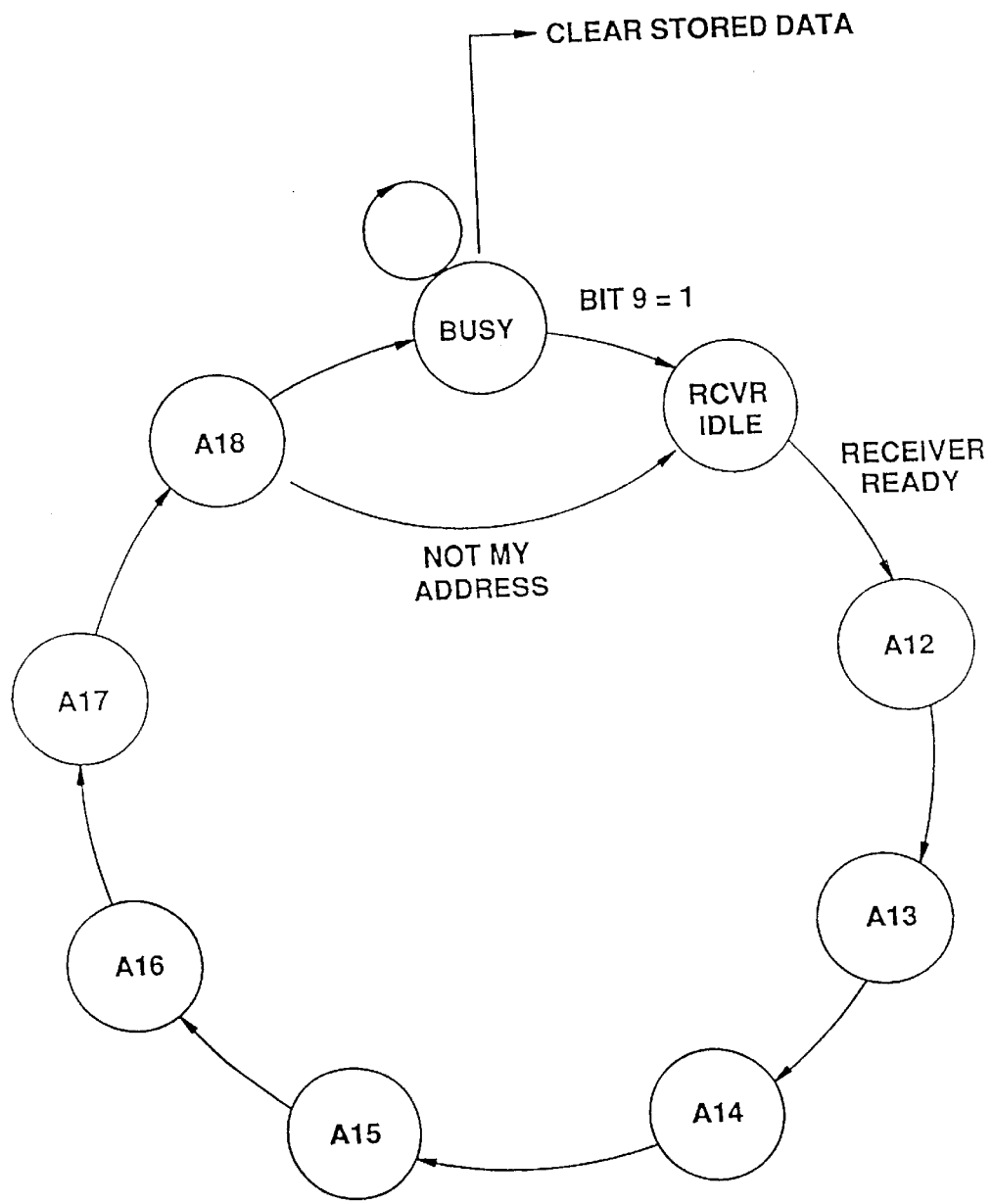
FIG. 14 is a state diagram of the receive phase.

As shown in FIG. 13, the bus controller 22 examines the first bit of data transmitted and compares it with its own address. If the first data bit is the unique identifier for that bus controller 22, data is accumulated until an end of message flag is encountered. If the first data bit is not the unique identifier of the listening bus controller 22, the bus controller 22 returns to the listening state.

There are two embodiments for the software to transmit messages. The first embodiment will allow waiting an average of 50 sec to send a message since there are no system interrupts performed. This simplifies queuing and unqueuing messages. The second embodiment assumes that messages are being sent fast, the operating system is fast and preemptive, system interrupts are handled quickly, and idling of the processor 32 is not allowed while messaging.

Upon completion of the transmit DMA, data bus 28 arbitration must take place. After the data bus 28 has been sucessfully arbitrated, the bus controller 22 may release the transmit FIFO 24 thereby placing the contents on the data bus 28. An empty flag signals a complete transfer to the bus controller 22 and processor module 34 CPU 32.

While specific embodiments of the present invention have been shown and described, many modifications and variations could be made by one skilled in the art without departing from the spirit and scope of the invention. The above description serves to illustrate and not limit the particular form in any way.

I claim:

1. An arbitration system allowing communication between a plurality of competing processing modules over a shared communication bus comprising:
   a common serial arbitration line coupled to a controller located on each processing module;
   each controller executing the same arbitration protocol; and
   each processing module controller shifting its respective module address onto said arbitration line while monitoring said arbitration line to detect for collisions on said arbitration line when communication with another processing module is desired, wherein no bus request signal is used prior to said shifting.

2. The arbitration system according to claim 1, wherein said controller uses three-state logic.

3. The arbitration system according to claim 2, wherein a processing module address is a plurality of bits.

4. The arbitration system according to claim 3, wherein said monitoring observes, bit-by-bit, whether a signal level on said arbitration line corresponds to said processing module's address.

5. The arbitration system according to claim 4, wherein if said signal level is different than-said-shifted-out address bit signal level, said processing module desiring access to the communication bus drops out of contention.

6. The arbitration system according to claim 4, wherein said processing module controller that successfully shifts out its complete address wins arbitration and maintains a low signal level on said arbitration line indicating that said arbitration line is asserted and that communication from said winning processing module may proceed on the bus.

7. An arbitration system allowing packetized message communication between a plurality of competing processing modules over a shared communication bus comprising:
   a common serial arbitration line coupled to a controller located on each processing module;
   each controller executing the same arbitration protocol; and
   each processing module controller shifting its respective module address onto said arbitration line while monitoring said arbitration line to detect for collisions on said arbitration line when communication with another processing module is desired, wherein no bus request signal is issued prior to said shifting.

8. The arbitration system according to claim 7, wherein said controller uses three-state logic.

9. The arbitration system according to claim 8, wherein a processing module address is a plurality of bits.

10. The arbitration system according to claim 9, wherein said monitoring observes, bit-by-bit, whether a signal level on said arbitration line corresponds to said processing module's address.

11. The arbitration system according to claim 10, wherein if said signal level is different than said shifted-out address bit signal level, said processing module desiring access to the communication bus drops out of contention.

12. The arbitration system according to claim 10, wherein said processing module controller that successfully shifts out its complete address wins arbitration and maintains a low signal level on said arbitration line indicating that said arbitration line is asserted and that communication from said winning processing module may proceed on the bus.

13. A method for arbitrating communication between a plurality of processing modules over a shares communication bus, each processing module having a controller, the method comprising the steps of:
   shifting out a processing module's address from the controller of a processing module desiring communication, whereby no bus request signal is issued prior to said shifting;
   monitoring said respective address as it is shifted-out of said controller;
   detecting collisions after each shifted-out bit; and
   asserting the arbitration line if no collisions are detected.

14. The method of arbitration according to claim 13 wherein the step of monitoring further observing, bit-by-bit, whether a signal level on said arbitration line corresponds to said processing module's address.

15. The method of arbitrating according to claim 14, wherein the step of detecting further includes dropping out of contention if said observed signal level is different than said shifted-out address bit signal level.

16. The method for arbitrating according to claim 15, wherein the step of asserting further comprises maintaining a low signal level on said arbitration line if said processing module controller successfully shifts-out its complete address.

* * * * *

UNITED STATES PATENT AND TRADEMARK OFFICE
CERTIFICATE OF CORRECTION

PATENT NO. : 6,405,272 B1
DATED : June 11, 2002
INVENTOR(S) : Robert T. Regis

It is certified that error appears in the above-identified patent and that said Letters Patent is hereby corrected as shown below:

Column 3,
Line 51, "bids" should read -- bus --.

Column 4,
Line 41, "50" should read -- 50% --.

Column 9,
Line 27, "sec" should read -- $\mu$sec --.
Line 58, "used" should read -- issued --.

Column 10,
Line 41, "shares" should read -- shared --.

Signed and Sealed this

Twenty-eighth Day of January, 2003

JAMES E. ROGAN
*Director of the United States Patent and Trademark Office*